June 25, 1957
J. P. KOVACS
2,796,989
FILTER AND FLUID TREATING ELEMENT
Filed Jan. 29, 1954
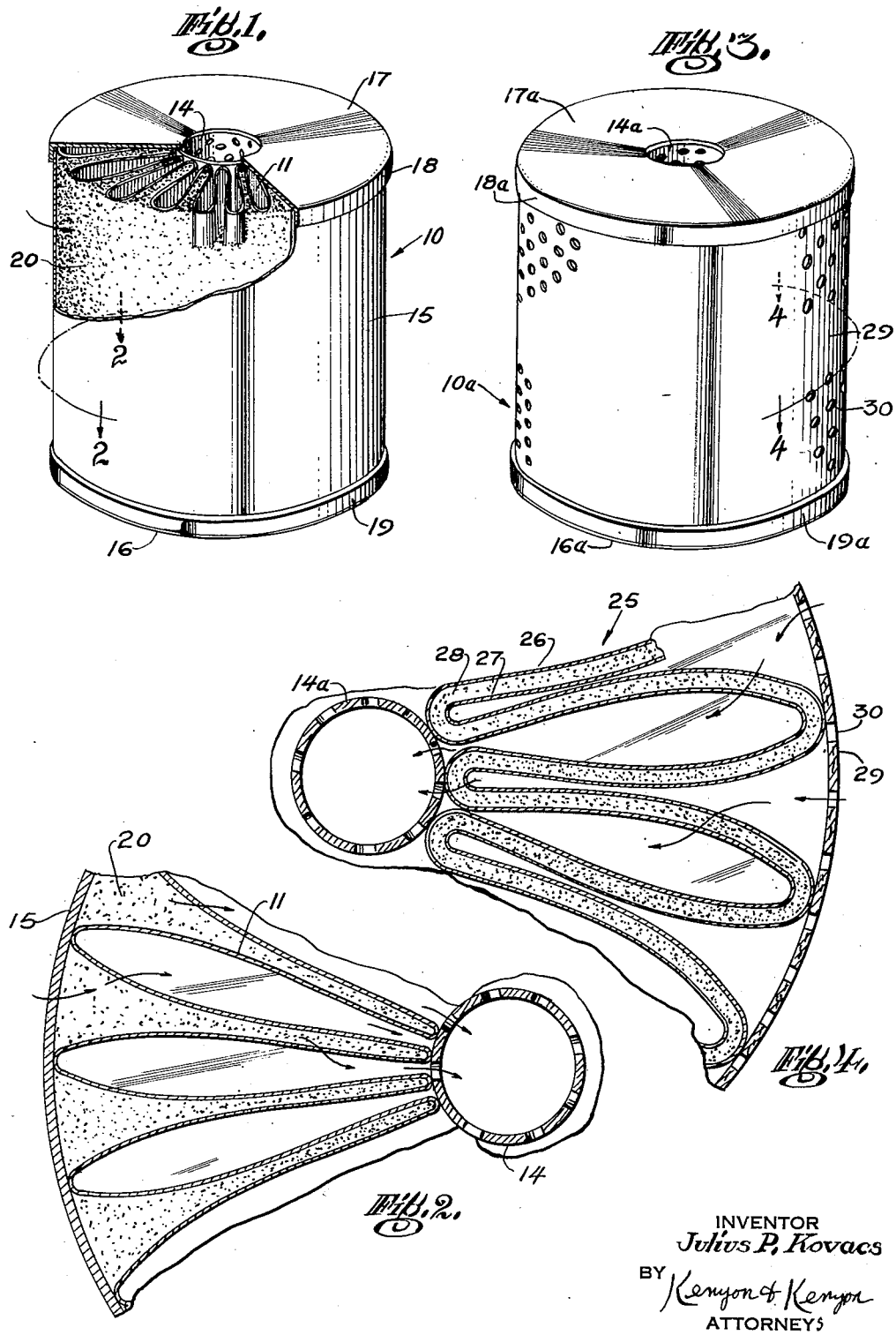
INVENTOR
Julius P. Kovacs
BY Kenyon & Kenyon
ATTORNEYS

2,796,989

FILTER AND FLUID TREATING ELEMENT

Julius P. Kovacs, Westfield, N. J., assignor to Purolator Products, Inc., Rahway, N. J., a corporation of Delaware Application January 29, 1954, Serial No. 407,082

2 Claims. (Cl. 210—282)

This invention relates to filter elements and more particularly to elements of this character with which fluid treating substances are incorporated so that filtration and fluid treatment may be effected at the same time.

The invention has among its principal objects and features the provision of filter elements with which fluid treating agents are incorporated in such a way that the filter elements may be utilized both as a filter for the removal of contaminants from the fluid passing through them also for treating this fluid in its transit for other purposes.

Among the other objects and features of the invention are the provision of a filter element for water which has incorporated therein means for treating the water by the addition of rust or corrosion inhibiting agents to it during its transit through the filter element.

Further objects and features of the invention are the provision of a filter element for water which has incorporated therein as treating means a means for softening the water during its transit through the filter element.

Further objects and features of the invention are the provision of a filter element suitable for filtering liquids such as fuel or lubricating oils which has incorporated therein as treating means a means for removing any water content of such liquids.

Other objects and features will become apparent from the following specification and accompanying drawing wherein:

Fig. 1 is a partially broken away perspective view of a filter element embodying the invention;

Fig. 2 is a fragmentary sectional view taken along line 2—2 of Fig. 1 and viewed in the direction of the arrows;

Fig. 3 is a perspective view of a filter element which includes a modification of the invention; and Fig. 4 is a fragmentary sectional view taken along line 4—4 of Fig. 3 and viewed in the direction of the arrows.

Referring first to Figs. 1 and 2, the reference character 10 denotes generally a filter element. This element 10 includes a filter body 11 of pleated, resin impregnated cellulosic sheet material such as paper arranged in the form of a tubular annulus surrounding a perforated center tube 14. The pleats of the body 11 extend radially from the outer surface of the center tube and their fold edges extend parallelly with the axis of said center tube. The material of the pleated body 11 preferably is sheet paper impregnated with phenol formaldehyde or melamine formaldehyde resin solutions as is well known in the art.

An external unbroken tubular wrapping 15 of fluid pervious cellulosic material surrounds the pleated body 11. The material of this wrapping may be the same as that of the body 11 and it may be similarly impregnated with a resin impregnant of the kind hereinabove mentioned.

End discs 16 and 17 are mounted at opposite ends of the pleated body 11. Preferably these end discs are of the same material as said body and are impregnated with the same type of resin as said body. These end discs 16 and 17 are applied, for example, to the outer end edges of the pleated filter body 11 in the manners described in Bell Patent No. 2,642,187 granted June 16, 1953, and in Layte and Bell Patent No. 2,642,188 also granted June 16, 1953, and are adhesively bonded to the end edges of the pleats by phenol formaldehyde resin cement as described in said patents or by the use of other suitable cements. During application of the end discs 16 and 17 to the body 11, the peripheral edge portions thereof are bent over to define annular rims 18 and 19 which overlap the outer upper and lower edges of the wrapping 15. These rims are adhered to the overlapped surfaces of said wrapping 15 by resin cement of the character mentioned applied to surface portions of the rims and wrapping which are brought into contact on the bending over of the peripheral edge portions of the end discs.

A filler or filling 20 preferably of granular or powdered fluid treating material is inserted in the space defined between the outer surfaces of the pleated filter body 11 and the inner surface of the wrapping 15. This granular treating material preferably fills said space entirely and is retained therein by the end discs 16 and 17. The material of the filling 20 depends upon the use to which the filter element is to be put. If it is desired to use the filter element 10 for filtration of water under conditions where inhibition of rust or corrosion is important, the treating material of filling 20 may consist of conventional rust or corrosion inhibitors such as granular or powdered sodium chromate, sodium silicate or sodium hydroxide or mixtures of these inhibitors, all of which have the properties of inhibiting or decreasing the corrosion rate of metallic surfaces. Other corrosion inhibiting materials may be substituted for the specific corrosion inhibitors mentioned.

If it is desired to use the filter element 10 for filtration of water under conditions requiring softening of the water, the treating material of filling 20 may consist of conventional water softening materials in granular or powdered form such as ion exchange agents. Among suitable ion exchange agents useful for water softening purposes are hydrated aluminum silicate of the type

$$Na_2O.Al_2O_3.nSiO_2.xH_2O$$

and sulfonated ion exchange resins. These ion exchange agents are frequently termed zeolites. The filling 20 may consist of specific ones of the said ion exchange agents or of mixtures of various of these water softeners.

If it is desired to use the filter element 10 for filtration of water under conditions where both water softening and corrosion inhibition are important, the treating material of filling 20 may consist of mixtures of one or more of the corrosion inhibitors hereinbefore mentioned and one or more of the ion exchange agents (water softeners) hereinbefore mentioned.

If the filter element 10 is intended for use in the filtration of lubricating oil or of fuel such as gasoline, either of which may contain entrained water which should be removed, the treating material of filling 20 comprises granular or powdered dehydrators or desiccants such as calcium chloride or regenerative amorphous silica, the latter known also as Silica Gel or as hydrated silica or as partially dehydrated colloidal silica. Other suitable dehydrators or desiccants such as granular amorphous aluminum oxide (activated alumina) or activated bauxite or other suitable powdered or granular desiccants available commercially may be used for the material filling 20. The filling 20 may, of course, comprise mixtures of two or more of the named desiccants if desired.

The filter element 10 containing filling 20 is intended for use in such a way that flow of fluid through the filter is first through the liquid pervious wall or wrapping 15 then through the filling 20 of liquid treating material and thereafter through the walls of the pleated filter body 11. After transit through the walls of said pleated filter body, the fluid enters center tube 14 through its perforations. In its transit through the filter element 10 as just described, some of the solid contaminants are removed by flow of fluid through the pervious wall or wrapping 15. On transit through the filling 20 thereafter the fluid is subjected to the treating action of the specific treating materials of which said filling is composed. Thus, if the filling 20 is a water softener or ion exchange agent herein mentioned and the fluid passing through the filter is water, the latter is softened in known manner. If the filling 20 is a corrosion inhibiting agent mentioned and the fluid again is water, corosion or rust inhibiting materal is added to the water flowing through said filling. If both these agents are present in the filling 20 both results occur. If on the other hand the filling 20 is a desiccant of the kind mentioned and the fluid passing through the filter element 10 is lubricating oil or liquid fuel oil such as gasoline having some water content, the desiccant material of filling 20 will act to remove the water content of the oil or fuel as it flows through said filling. In final transit of any of the fluids mentioned through the pleated filter body 11 of any specific filter element 10 into its perforated center tube 14, the solid contaminants in such fluid are trapped on the internal walls of said pleated filter body 11. The fluid entering center tube 14 is thus fully filtered being free of deleterious solid impurities or contaminants. In addition, it has the desired attributes contributed by the treating action of the material of filling 20 on the fluid in its transit through the filter element. Thus, if the fluid is water, it has been softened, or has had corrosion inhibitor added thereto or has had a combination of these attributes imparted to it depending upon the specific constitutents of the filling 20 through which it has passed in a specific filter element 10. If the fluid is lubricating oil or fuel oil with entrained water, the latter is eliminated by transit of the oil through the desiccant material of filling 20 and the filtered oil entering center tube 14 is free of its water content.

The filter element 10 is regarded as of a replaceable type and is utilized until its pleated filter body 11 becomes sufficiently clogged by the accumulation of trapped solid contaminants on its surface to prevent adequate flow of fluid through it or until the desired treating properties of its filling material 20 have been exhausted. When either clogging or exhaustion of the type mentioned occurs, the element 10 is replaced by a duplicate element of like construction.

Since the structural components of the filter element 10 and its filling material 20 are relatively inexpensive and can be readily assembled into a complete filter element, the arrangement described provides a simple means for combining desired liquid treatment with effective filtration in a single compact unit. Advantages of such arrangement are almost self-evident.

A modification of the invention is shown in Figs. 3 and 4. In this embodiment all parts bearing the same reference characters with added subscripts $a$ correspond to like numbered parts of Figs. 1 and 2. The filter element 10a like the filter element 10 of the first embodiment includes a perforated center tube 14a. In place of the pleated filter body 11 of Figs. 1 and 2, however, a pleated filter body 25 is substituted. This pleated filter body 25 comprises a pair of spaced apart coaxially disposed pleated sheets of filter paper 26 and 27 each of which is of the same material as the pleated body 11 of Fig. 1 and each of which is impregnated with the same resin as said body 11. A filling 28 preferably of granular or powdered material is inserted between the pleated sheets 26 and 27. This filling 28 is of any of the materials hereinabove specified for the filling 20 of Fig. 1. The particular one or ones of said materials inserted as a filling 28 between the pleated sheets depends upon the specific use to which the filter element 10a is to be put. When a filter element 10a is to be used for the same specific purpose as a corresponding particular filter element 10, the material of filling 28 of element 10a will be identical with the material of the filling 20 of the corresponding filter element 10.

The pleated filter body 25 arranged in form of an annulus is positioned around the perforated center tube 14a with the pleats extending radially from the outer surface of said center tube and with their folded edges parallel with the axis of said center tube. An external perforated wrapping 29, for example, of cellulosic material, surrounds the pleated body 25. The material of this wrapping may be the same as that of the sheets 26 and 27, similarly resin impregnated or it may be of other suitable materials. Perforations 30 in the surface of the wrapping 29 permit flow of fluid to be filtered through the wrapping 29.

The end discs 16a and 17a identical with end discs 16 and 17 and applied in the same way close off the opposite ends of the pleated filter body 25. The annular rims 18a and 19a overlap the upper and lower edges of the wrapping 29 and are adhered thereto in the same way as rims 18 and 19 are adhered to wrapping 15.

The filter element 10a of Figs. 3 and 4 is intended for operation substantially in the same way as the filter element 10 preferably so that flow of fluid through the element 10a is from the outside in, first through the perforated wrapping 29, then through the pleated filter sheet 27, thereafter through the filling 28 between pleated sheets 26 and 27, thereafter through pleated filter sheet 26 and thence into the perforated center tube 14a. In its transit through the wall of the first pleated sheet of filter paper 27, solid contaminants are trapped on the outer face of said sheet 27. The transit thereafter of the liquid being filtered through the treating material 28 subjects it to desired treatment such as water softening, corrosion inhibition or combinations of these two if water is being filtered, or else if oil is being filtered to desiccation in the same way as corresponding materials of filling 20 would act upon like liquids passing through a filter element 10 as hereinbefore described. After transit through the treating material of filling 28 the liquid in its further transit through the second or innermost pleated filter sheet 27 is subjected to a second filtration stage so that the filtered liquid reaching center tube 14a is entirely free of solid contaminants. The same filtering and treating action on liquids would be effected by reverse flow of liquid through the filter element 10a. Thus, element 10a may be used also in filter housings in which fluid to be filtered is intended to flow from the inside of the element outwardly.

Inasmuch as the structural components of filter element 10a and its filling material 28 are relatively inexpensive and can be readily assembled into a complete filter element, the arrangement of Figs. 3 and 4 also provides a simple means for combining liquid treating with effective filtration in a single compact unit.

While specific embodiments of the invention have been described and illustrated, variations in structural detail within the scope of the appended claims are possible and are contemplated. There is no intention, therefore, of limitation to the exact details shown and described.

What is claimed is:

1. A filter element comprising a pleated body of filtering material arranged in form of a tubular annulus, a liquid pervious wrapping surrounding the tubular annulus, end discs closing off opposite ends of the tubular annulus and a filling of an independent loose granular treating material for liquid disposed internally of said wrapping and in spaces between the latter and outermost surfaces defining pleats of said pleated body for complete flow through both the filtering material and the granular material, respectively, for filtration by the filtering means and independent treatment by the granular material of all fluid passing through the filter element.

2. A filter element for fluids comprising a center tube, a pleated filter body mounted on said center tube, a fluid pervious wrapping surrounding said body, end discs at both ends of said tube, body and wrapping and an independent loose granular filling of fluid-treating material disposed in spaces between the wrapping and outer surfaces of pleats of said pleated filter body for complete flow through both the filtering material and the granular material, respectively, for filtration by the filtering means and independent treatment by the granular material of all fluid passing through the filter element.

References Cited in the file of this patent

UNITED STATES PATENTS

| | | |
|---|---|---|
| 1,728,305 | Raney | Sept. 17, 1929 |
| 1,921,137 | Schlissel | Aug. 8, 1933 |
| 2,057,414 | Briggs et al. | Oct. 13, 1936 |
| 2,082,322 | Brundage | June 1, 1937 |
| 2,371,444 | Hubert | Mar. 13, 1945 |
| 2,381,354 | Larson | Aug. 7, 1945 |
| 2,395,449 | Briggs | Feb. 26, 1946 |
| 2,675,127 | Layte | Apr. 13, 1954 |

FOREIGN PATENTS

| | | |
|---|---|---|
| 588,991 | Great Britain | June 9, 1947 |

OTHER REFERENCES

Industrial and Engineering Chemistry, vol. 33, No. 12, December 1941, p. 1502.